Figure 1:
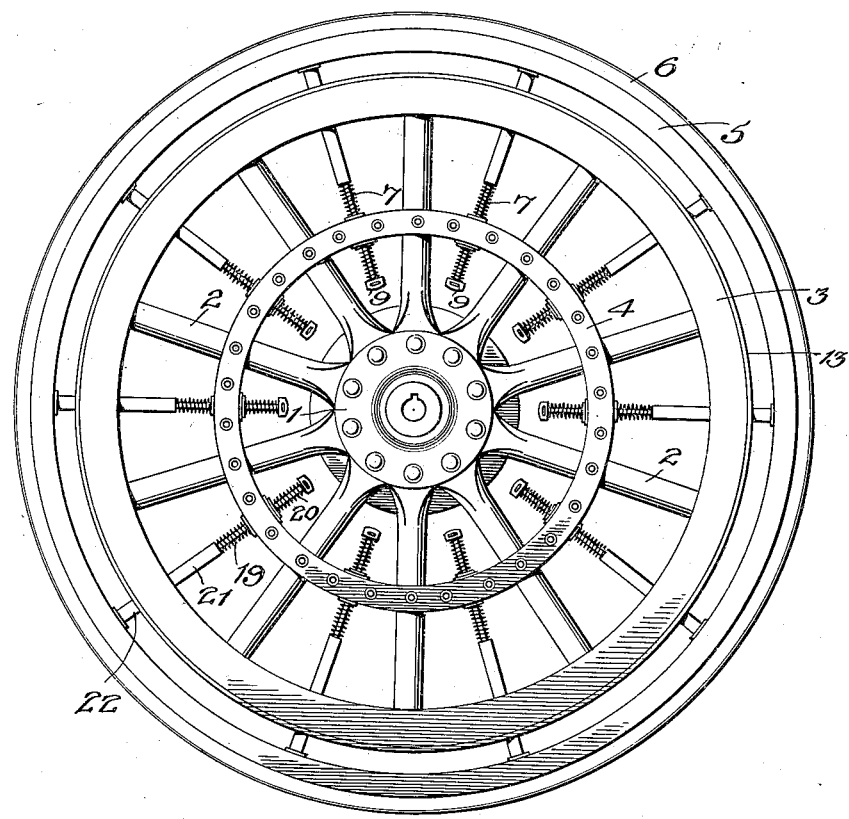

W. J. LUTTRELL.
RESILIENT WHEEL.
APPLICATION FILED MAR. 23, 1916.

1,200,632.

Patented Oct. 10, 1916.
2 SHEETS—SHEET 1.

Inventor
William J. Luttrell
By H. B. Willson & Co.
Attorneys

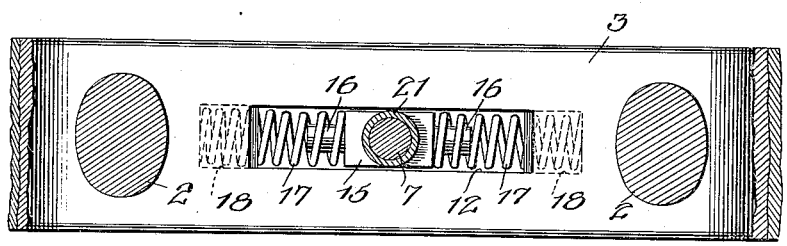
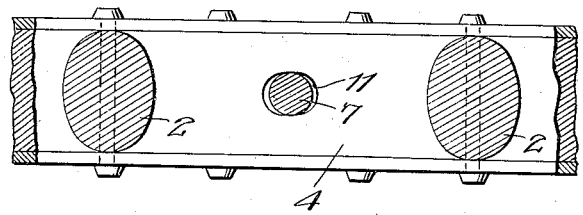
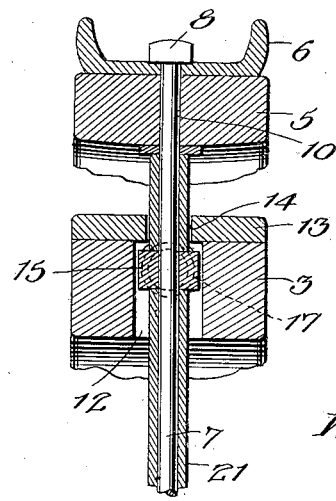

UNITED STATES PATENT OFFICE.

WILLIAM J. LUTTRELL, OF HONEY GROVE, TEXAS.

RESILIENT WHEEL.

1,200,632.  Specification of Letters Patent.  Patented Oct. 10, 1916.

Application filed March 23, 1916. Serial No. 86,221.

*To all whom it may concern:*

Be it known that I, WILLIAM J. LUTTRELL, a citizen of the United States, residing at Honey Grove, in the county of Fannin and State of Texas, have invented certain new and useful Improvements in Resilient Wheels; and I do declare the following to be a full, clear, and exact description of the invention, such as will enable others skilled in the art to which it appertains to make and use the same.

This invention relates to improvements in spring wheels for automobiles and other vehicles of that type in which the wheel proper is surrounded by an auxiliary tread which is spaced apart from the rim and yieldably maintained in position by means of a plurality of auxiliary spokes.

The principal object of the present invention is to provide a simply constructed spring wheel and a very simple yet effective means for disposing the cushioning members upon the auxiliary spokes.

Figure 2:
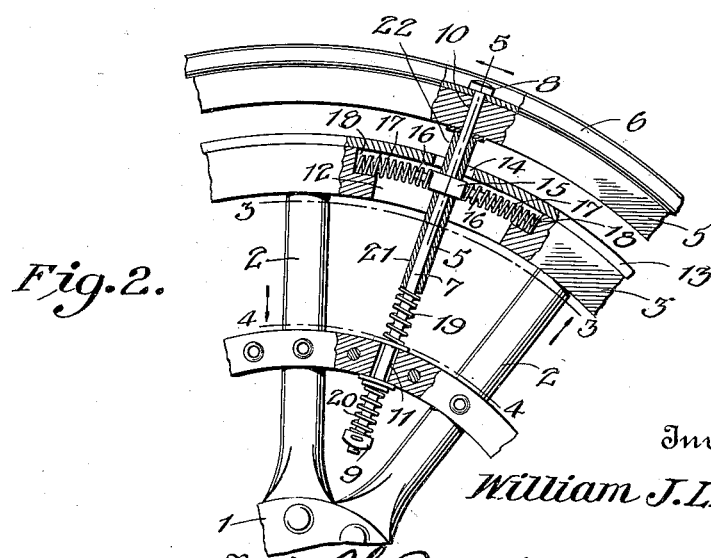

With this general object in view, my invention resides in the novel features of construction, combination and arrangement of parts which will hereinafter be more particularly described and claimed and shown in the drawings wherein:

Figure 1 represents a side elevation of a spring wheel constructed in accordance with my invention; Fig. 2 is a portion of my wheel on an enlarged scale partly in section so as to show the invention more clearly; Figs. 3 and 4 are respectively, sections taken on the lines 3—3 and 4—4 of Fig. 2; and Fig. 5 is a transverse section taken on the line 5—5 of Fig. 2.

In the embodiment illustrated, I have shown a wheel having a hub member 1 from which spokes 2 radiate and are connected with an outer rim 3 at their ends, a reinforcing or inner rim 4 being disposed between the outer rim 3 and the hub 1 and concentric thereto. This additional rim is rigidly secured to the spokes 2, said spokes preferably passing through openings therein. Surrounding the outer rim 3 and spaced therefrom, is a tread member 5 which is supported by the auxiliary spokes which will hereinafter be described, said tread member 5 being provided with a channeled metallic tread 6 in which if desired, a suitable pneumatic or other resilient form of tire may be disposed. When, however, the vehicle upon which my improved wheels are used is run exclusively over country roads, a resilient tire is unnecessary, the channeled tread 6 becoming packed with dirt and providing a very efficient tire.

The auxiliary spokes are shown in the present instance in the form of rods 7 having heads 8 on their outer ends while their inner ends are screw threaded and provided with nuts 9. These rods are extended through alined apertures 10 and 11 in the tread member and inner rim respectively, and in the alined slots 12 formed in the outer rim member 3. The channeled tread 6 as well as a reinforcing ring 13 for the outer rim 3 is provided with openings to receive said rods, those in the ring being elongated to form slots 14.

On each of the rods 7 is placed a block 15 which is slidable thereon and disposed in one of the slots 12. The opposite sides of these blocks 15 are provided with outwardly extending studs 16 which receive the adjacent ends of opposed springs 17, the other ends of these springs being disposed in the ends of these springs being disposed in the lateral recesses 18, which communicate with the opposite ends of the radial slots 12. By this arrangement, the tread member 5 may be moved circumferentially with respect to the remainder of the wheel, thus reducing the strain thereon occasioned by the starting of the vehicle. One of these auxiliary spokes is preferably disposed between each pair of main spokes, but it is obvious that this arrangement need not be followed unless the weight of the vehicle necessitates extremely strong wheels. In addition to the circumferential movement, the tread member 5 also has longitudinal movement with respect to the rest of the wheel, this movement, however, being limited by the cushioning members in the form of springs 19 and 20 which surround the inner portions of the rods 7, these springs 19 being disposed in contact with the outer portions of the inner rim, while the springs 20 are disposed between the inner rim and the nuts 9 on the ends of the rods. The springs 20 are thus held between said nuts and the inner rim while the springs 19 are held between said rim and spacing sleeves 21, the opposite ends thereof being in contact with said blocks 15. Additional spacing sleeves 22 are disposed between said blocks 15 and the tread member 5 to hold said blocks in operative position within the slots 12 so that the springs 17 will remain active.

From this description, it will be seen that while I have provided a number of extremely simple auxiliary spokes for cushioning the tread member, yet nevertheless, I have constructed an extremely effective resilient wheel which will be found to be a great improvement over similar wheels already in use.

I claim as my invention:

In a resilient wheel, a hub, spokes extending radially therefrom, inner and outer rims surrounding said hub and rigidly secured concentric thereto and to each other by said spokes, said outer rim having radial slots and lateral recesses leading from the ends thereof, one of said slots being disposed between each pair of said spokes, the inner rim having apertures between said spokes alined with said slots, rods slidable longitudinally in said slots and apertures and movable circumferentially in the former, heads on the outer and inner ends of said rods, a block on each rod within the slot, and each having studs on its opposite sides, opposed springs in the recesses of each slot surrounding said studs, spacing sleeves on the outer ends of said rods in contact with said blocks, a tread member surrounding and spaced from the outer rim, and held between said sleeves and the outer heads, springs interposed between the inner rim and the inner heads, spacing sleeves on the rods between the rims, and springs interposed between the last mentioned sleeves and the inner rim.

In testimony whereof I have hereunto set my hand in presence of two subscribing witnesses.

WILLIAM J. LUTTRELL.

Witnesses:
J. Perry Reynolds,
Delmur Taylor.